United States Patent
Wang et al.

(10) Patent No.: US 10,923,158 B1
(45) Date of Patent: Feb. 16, 2021

(54) DYNAMIC SEQUENTIAL IMAGE PROCESSING

(71) Applicant: International Business Machines Corporation, Armonk, NY (US)

(72) Inventors: Qing Wang, Beijing (CN); Shi Lei Zhang, Beijing (CN); Jie Zhang, Beijing (CN); Shiwan Zhao, Beijing (CN); Yubo Li, Beijing (CN); Ke Jin, Beijing (CN); Junsong Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/693,427

(22) Filed: Nov. 25, 2019

(51) Int. Cl.
*G11B 27/30* (2006.01)
*G06K 9/00* (2006.01)

(52) U.S. Cl.
CPC ...... *G11B 27/3081* (2013.01); *G06K 9/00724* (2013.01); *G06K 9/00744* (2013.01); *G06K 9/00765* (2013.01)

(58) Field of Classification Search
CPC ........... G11B 27/3081; G06K 9/00724; G06K 9/00744; G06K 9/00765
See application file for complete search history.

(56) References Cited

U.S. PATENT DOCUMENTS

| | | | |
|---|---|---|---|
| 2002/0012527 A1* | 1/2002 | Higashimura | G11B 27/107 386/324 |
| 2006/0198443 A1 | 9/2006 | Liang et al. | |
| 2009/0019025 A1* | 1/2009 | Chen | G06F 16/634 |
| 2010/0027663 A1 | 2/2010 | Dai et al. | |
| 2015/0016804 A1* | 1/2015 | Biderman | H04N 21/6587 386/343 |

(Continued)

FOREIGN PATENT DOCUMENTS

CN 108833915 A 11/2018

OTHER PUBLICATIONS

Neitz et al., "Adaptive Skip Intervals: Temporal Abstraction for Recurrent Dynamical Models", 32nd Conference on Neural Information Processing Systems, 2018, 11 pages.

(Continued)

*Primary Examiner* — Thai Q Tran
*Assistant Examiner* — Sunghyoun Park
(74) *Attorney, Agent, or Firm* — Jamar K. Ray

(57) ABSTRACT

A method includes obtaining a first set of parameters corresponding to a first video, such parameters including a first skip number and a first segment length. The method includes obtaining a first set of image feature values corresponding to the first video and storing the first set of parameters and the first set of image feature values as reference data. The method includes calculating a second set of image feature values corresponding to a second video and comparing the second set of image feature values to the reference data, and determining, based on the comparing, that the second set of image feature values exceeds a threshold. The method includes calculating, in response to the determining, a variance. The method includes generating, based on the variance, a second set of parameters corresponding to the second video, the second set of parameters including a second skip number and a second segment length.

20 Claims, 5 Drawing Sheets

(56) References Cited

U.S. PATENT DOCUMENTS

2017/0078687 A1* 3/2017 Coward .............. H04N 19/395
2017/0272755 A1 9/2017 Holcomb et al.
2017/0372142 A1* 12/2017 Bilobrov ............. H04N 21/233

OTHER PUBLICATIONS

Song et al., "Spatio-Temporal Action Detection in Untrimmed Videos by Using Multimodal Features and Region Proposals", Sensors (Basel), Mar. 19, 2019, 24 pages.

Lin et al., "Detection of Frame Duplication Forgery in Videos Based on Spatial and Temporal Analysis", Article in International Journal of Pattern Recognition and Artificial Intelligence, Feb. 2013, 28 pages.

Fadlallah et al., "Video Streaming Based on Frame Skipping and Interpolation Techniques", IJISET—International Journal of Innovative Science, Engineering & Technology, vol. 3 Issue 7, Jul. 2016, pp. 678-683.

Yang et al., "Multiscale video sequence matching for near-duplicate detection and retrieval", Springer, Multimed Tools Appl, Published Online May 4, 2018, 26 pages.

Mell et al., "The NIST Definition of Cloud Computing", Recommendations of the National Institute of Standards and Technology, Sep. 2011, 7 pages.

* cited by examiner

DYNAMIC SEQUENTIAL IMAGE PROCESSING

BACKGROUND

The present disclosure relates to video analysis, and more specifically, to sequential image processing.

Video analysis tasks, such as automated identification of one or more objects or actions appearing in a video, can include sequential image processing. A video can include a sequence of images, or frames. During sequential image processing, the video can be divided into segments of frames, with each segment having a segment length (i.e., a number of sequential frames).

SUMMARY

A method includes obtaining a first set of parameters corresponding to a first video. The first set of parameters including a first skip number and a first segment length. The method includes obtaining a first set of image feature values corresponding to the first video and storing the first set of parameters and the first set of image feature values as reference data. The method includes calculating a second set of image feature values corresponding to a second video and comparing the second set of image feature values to the reference data to generate a first degree of difference. The method includes determining, based on the comparing, that the first degree of difference exceeds a threshold. The method includes calculating, in response to the determining, a variance between the first set of image feature values and the reference data. The method includes generating, based on the variance, a second set of parameters corresponding to the second video, the second set of parameters including a second skip number and a second segment length.

A system and a computer program product corresponding to the above method are also included herein.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
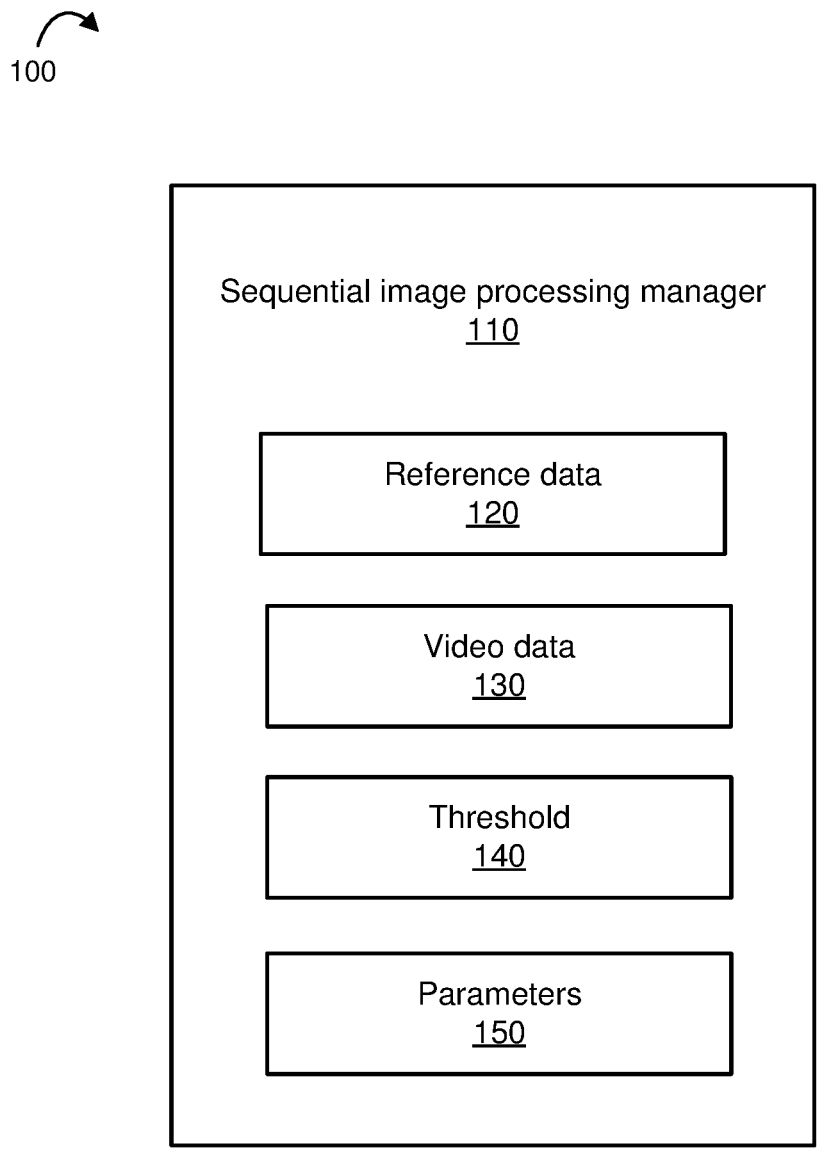
FIG. 1 depicts a dynamic sequential image processing system, in accordance with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to video analysis; more particular aspects relate to dynamic sequential image processing. While the present disclosure is not necessarily limited to such applications, various aspects of the disclosure may be appreciated through a discussion of various examples using this context.

Video analysis tasks, such as automated identification of one or more objects or actions appearing in a video, can include sequential image processing. A video can include a sequence of images, or frames. During sequential image processing, the video can be divided into segments of frames, with each segment having a segment length (i.e., a number of sequential frames). Since the frames in a segment can include a large amount of redundant information, sequential image processing can include skipping a predetermined number of frames to eliminate unnecessary data. A segment length and a number of skipped frames (i.e., a skip number) can be determined based on a general categorization of the video as displaying fast activity or slow activity. Fast activity can include activity that can benefit from being recorded at a rate of approximately 30 frames per second or greater. Such fast activity can include relatively high rates of motion, such as movements in sports footage or in action scenes of movies. In contrast, slow activity can include activity that can benefit from being recorded at a rate of up to approximately 24 frames per second. Such slow activity can include slower rates of motion than that included in sports footage or action scenes of movies.

Methods for determining a segment length and a skip number can have a number of shortcomings. For example, in some instances, methods can require prior knowledge and/or prior assessment of video content (e.g., whether a video includes fast activity or slow activity). Such prior knowledge and/or prior assessment of video content may not be readily available. In some instances, videos can include segments having varying speeds of activity. Thus, in these instances, using fixed values for a segment length and a skip number based on a general categorization of the video's activity can result in segment lengths and skip numbers that do not correspond to a speed of video activity, which can further result in inefficient and/or inaccurate image processing.

To address these and other issues, embodiments of the present disclosure include a method to dynamically determine a segment length and a skip number for a video based on one or more temporal-spatial features. Embodiments of the present disclosure include an offline, pre-configuration stage, in which a sequential image processing manager generates a set of reference data values from a benchmark video. Embodiments of the present disclosure further include an online stage, in which the sequential image processing manager calculates values for one or more temporal-spatial features of an input video, compares the calculated values to the set of reference data values, and generates a set of skip numbers and a segment length for the input video based on the comparison.

Accordingly, embodiments of the present disclosure can generate a set of skip numbers and a segment length for an input video that is tailored to the image features of the input video. Additionally, embodiments of the present disclosure can utilize basic image features and do not require complex feature extraction processes. Thus, embodiments of the present disclosure can facilitate efficient and accurate image processing.

Turning to the figures, FIG. 1 illustrates a dynamic sequential image processing system ("DSIP system") 100, in accordance with embodiments of the present disclosure. The DSIP system 100 can include a sequential image processing manager 110. The sequential image processing manager 110 can include one or more processors configured to perform one or more of the method steps 200 discussed with respect to FIG. 2. In some embodiments, the sequential image processing manager 110 can include one or more computer systems, such as the computer system 301 described with respect to FIG. 3. Referring back to FIG. 1, the sequential image processing manager 110 can obtain video data 130 and store reference data 120. In some embodiments, video data 130 can be compared to reference data 120 to generate a degree of difference between the video data 130 and the reference data 120. If the degree of difference is less than the threshold 140, then the DSIP 100 can assign parameters 150 to the video data 130 (e.g., video data corresponding to an input video) that are identical to parameters stored in the reference data 120. In contrast, if the degree of difference between the video data 130 and the reference data 120 is above the threshold 140, the degree of difference can be used to generate parameters 150 for the video data 130 based on the parameters associated with the reference data 120 and the degree of difference.

Figure 2:
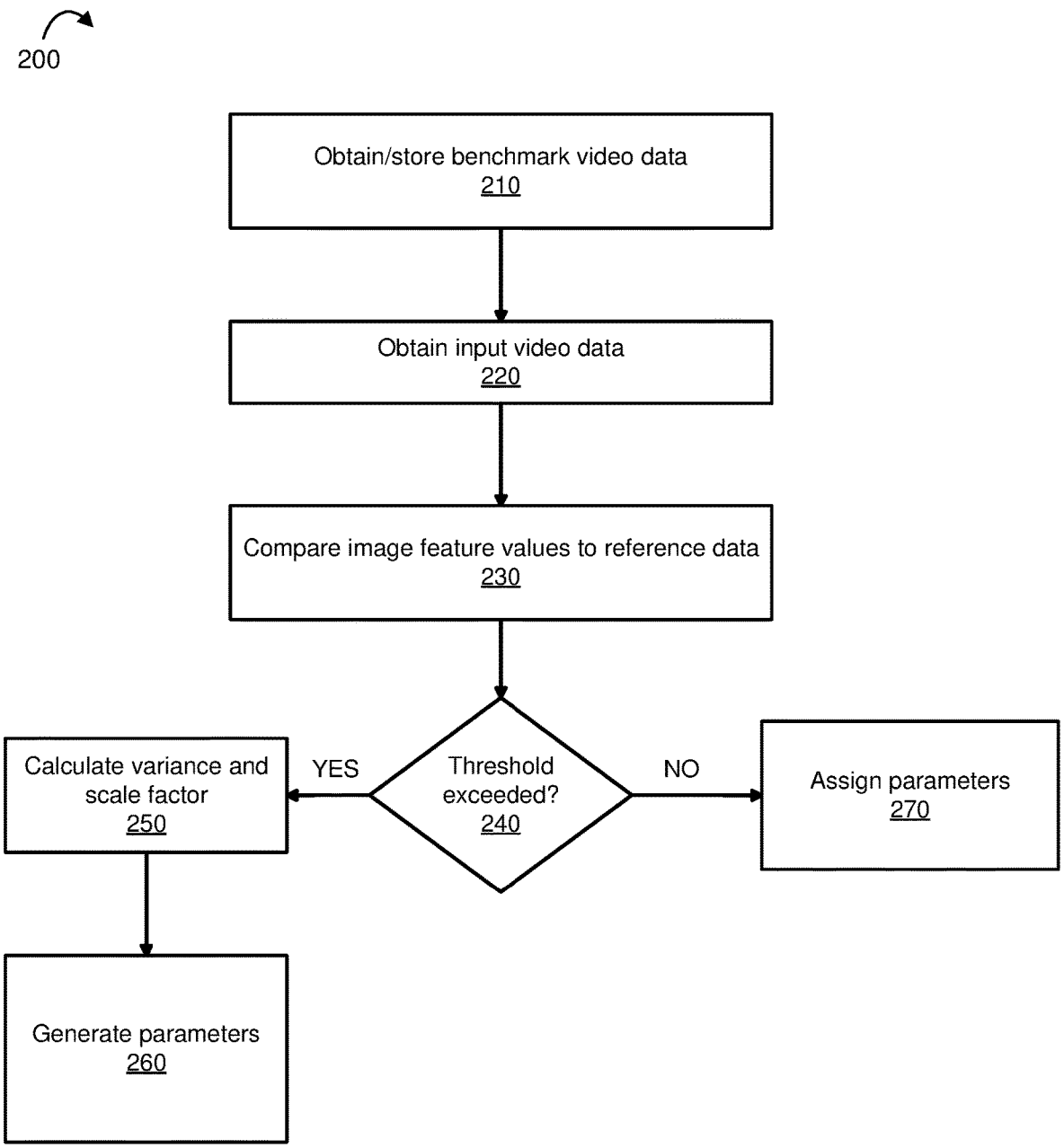
FIG. 2 depicts a flowchart of an example method for generating a segment length and a skip number, in accordance with embodiments of the present disclosure.

FIG. 2 illustrates a flowchart of an example method 200 for generating a segment length and a skip number, in accordance with embodiments of the present disclosure. In some embodiments, the method 200 can be implemented by an image processing system, such as the DSIP system 100 described with respect to FIG. 1.

Referring back to FIG. 2, in step 210, the DSIP system can obtain and store benchmark video data. Benchmark video data can include information such as a video file and/or information corresponding to a video file. For example, benchmark video data can include a set of parameters (e.g., a skip number and/or a segment length) and/or a set of image feature values (e.g., 3-D histogram values, optical flow values, and/or differential Red-Green-Blue (RGB) values) that correspond to a video file (e.g., a digital file that includes recorded video images). In some embodiments, a benchmark video can include a video for which a set of parameters and/or a set of image feature values have been predetermined. Such predetermined parameters and/or image feature values can satisfy a preferred correspondence to the benchmark video and/or to a type of benchmark video (e.g., a benchmark video including fast activity, slow activity, or a combination of fast and slow activity).

For example, in some embodiments, a benchmark video can include fast activity. Furthermore, the benchmark video can have a predetermined skip number of 5 frames and a predetermined segment length of 30 seconds (s) of frames. Further in this example, the predetermined skip number and segment length values may have been determined from a thorough analysis of the benchmark video, such that the values reflect a user's preferred values for fast activity video content.

In some embodiments, step 210 can include the DSIP system calculating a set of image feature values for a benchmark video using available image processing tools included on a processor of the DSIP system. In some embodiments, step 210 can include the DSIP system storing the benchmark video data as reference data, such as reference data 120 discussed with respect to FIG. 1.

In step 220, the DSIP system can obtain input video data, such as video data 130 as discussed with respect to FIG. 1. Input video data can include information such as a video file and/or information corresponding to a video file, such as a set of image feature values (e.g., 3-D histogram values, optical flow values, and/or differential RGB values). In some embodiments, step 220 can include the DSIP system calculating a set of image feature values using available image processing tools included on a processor of the DSIP system. In some embodiments, input video data can correspond to an input video, and the DSIP system can be used to generate a set of parameters for the input video, as discussed in the steps below.

In step 230, the DSIP system can compare a set of image feature values to corresponding reference data. Corresponding reference data can include reference data of a category that matches a category of a set of image feature values. For example, in some embodiments, step 230 can include the DSIP system comparing optical flow values corresponding to an input video to optical flow values stored as a reference data, as both values can be categorized as optical flow values. In some embodiments, step 230 can include comparing more than one category of image feature values. For example, a set of image feature values corresponding to an input video can include 3-D histogram values, optical flow values, and differential RGB values. In this example, step 230 can include comparing each of the 3-D histogram values, optical flow values, and differential RGB values to corresponding reference data. In some embodiments, step 230 includes determining, calculating, or generating a degree of difference (or a degree of similarity) between the compared image feature values. In some embodiments, a degree of difference (or a degree of similarity) can include values such as a percentage difference, a number of matching (or non-matching) values, and the like.

In step 240, the DSIP system can determine, based on the comparison, whether a threshold is exceeded. Step 240 can include the DSIP system using one or more thresholds. For example, in some embodiments, a threshold can specify a percentage difference between two image feature values. In some embodiments, a threshold can specify a number of matching (or non-matching) categories of image feature values.

For example, input video data can include three image feature values: X (a set of 3-D histogram values), Y (a set of optical flow values), and Z (a set of differential RGB values). Further in this example, reference data can include three image feature values: X (a set of 3-D histogram values), V (a set of optical flow values), and W (a set of differential RGB values). Further in this example, a threshold can specify that a maximum of one image feature value of the input video data does not match a corresponding image feature value of the reference data. Continuing with this example, the DSIP system can determine that two image feature values do not match: (1) of the optical flow values, the Y value of the input video data does not match the V value of the reference data, and (2) of the differential RGB values, the Z value of the input video data does match the W value of the reference data. Continuing with this example, the threshold is exceeded because two image feature values of the input video data do not match corresponding (i.e., same category) image feature values of the reference data. Accordingly, in this example, the DSIP system can proceed to step 250.

However, if the DSIP system determines in step 240 that a threshold is not exceeded, the DSIP system can proceed to step 270. For example, if in the example above, all of the image feature values matched, then the threshold would not be exceeded. In some embodiments, two values or sets of values can be said to match when a degree of difference between the two values or sets of values is less than a threshold.

In step 270, the DSIP system can assign parameters (e.g., a skip number and/or a segment length) included in the reference data to the input video. Such reference data can correspond to a benchmark video. Accordingly, the DSIP system can assign a set of parameters (e.g., a skip number and/or a segment length) corresponding to a benchmark video to an input video. Furthermore, the DSIP system can perform such an assignment when the input video has a set of image feature values (e.g., 3-D histogram values, optical flow values, and/or differential RGB values) that are within a threshold of a set of image feature values of the benchmark video.

In step 250, the DSIP system can calculate one or more variances and scale factors. A variance can include a mathematical calculation of a difference between sets of image feature values. For example, a variance can include using the matrix values of a histogram corresponding to the input video and the matrix values corresponding to a histogram included in the reference data and calculating an average of the squared differences from the mean of the matrix values. In some embodiments, step 250 can include the DSIP system calculating both a temporal variance and a spatial variance between a 3-D histogram of a benchmark video and a 3-D histogram of an input video. For example, in some embodiments the temporal variance can indicate a difference in how colors change over time in a segment of an input video as compared to a segment of a benchmark video. In some embodiments, a spatial variance can indicate a difference in how colors are distributed in frames of an input video as compared to frames of a benchmark video. In some embodiments, step 250 can include calculating a segment length scale factor (SF_seg) and a skip number scale factor (SF_skip). The respective scale factor can be a weighted sum of the temporal variance (Var_t) and the spatial variance (Var_s), where the respective weights (a, b, c, d) applied to the temporal variance and the spatial variance can be similar or different. For example, in some embodiments, a segment length scale factor can be calculated using formula (1) and a skip number scale factor can be calculated using formula (2):

$$SF\_seg = a*Var\_t + b*Var\_s \qquad (1)$$

$$SF\_skip = c*Var\_t + d*Var\_s \qquad (2)$$

In some embodiments, a, b, c, and d can be hyperparameters, such as values derived from prior calculations and selected by a user to improve the accuracy of the scale factor values. In some embodiments, the sum of a and b can be a value such as 1 or 100%, such that the temporal variance (Var_t) and the spatial variance (Var_s) can be adjusted according to their relative importance to the segment length scale factor (SF_seg) calculation (e.g., a can be greater than 50% and b can be less than 50% when the relative importance of the temporal variance (Var_t) is greater than that of the spatial variance (Var_s)). In some embodiments, the sum of c and d can be a value such as 1 or 100% to provide an analogous relative importance effect for the skip number scale factor (SF_skip) calculation.

In step 260, the DSIP system can generate a set of parameters (e.g., a skip number and/or a segment length) for the input video, based on the reference data and the scale factors calculated in step 250. The DSIP system can generate the set of parameters using one or more mathematical relationships that include the reference data and the scale factors. For example, in some embodiments, an input video segment length (SL_input) and an input video skip number (SN_input) can be calculated using formulas (3) and (4), respectively:

$$SL\_input = w*SF\_seg + SL\_ref \qquad (3),$$

$$SN\_input = z*SF\_skip + SN\_ref \qquad (4),$$

where SL_ref is a segment length (e.g., a benchmark video segment length) included in the reference data, SN_ref is a skip number (e.g., a benchmark video skip number) included in the reference data. Additionally, w and z can be hyperparameters, such as values derived from prior calculations and selected by a user to improve the accuracy of the parameter values.

Although not explicitly shown, step 260 can further include assigning the generated parameters to the input video. In some embodiments, the DSIP system can store the generated parameters (e.g., SL_input and SN_input) as reference data (e.g., the DSIP system can store the generated parameters in memory of the DSIP system), such that the generated parameters can be used with a subsequent input video during a subsequent cycle of method 200. In this way, the set of reference data can be increased, such that it includes more data than the benchmark video data; thus, the set of reference data can be expanded to accommodate an increased variety of input video types.

Figure 3:
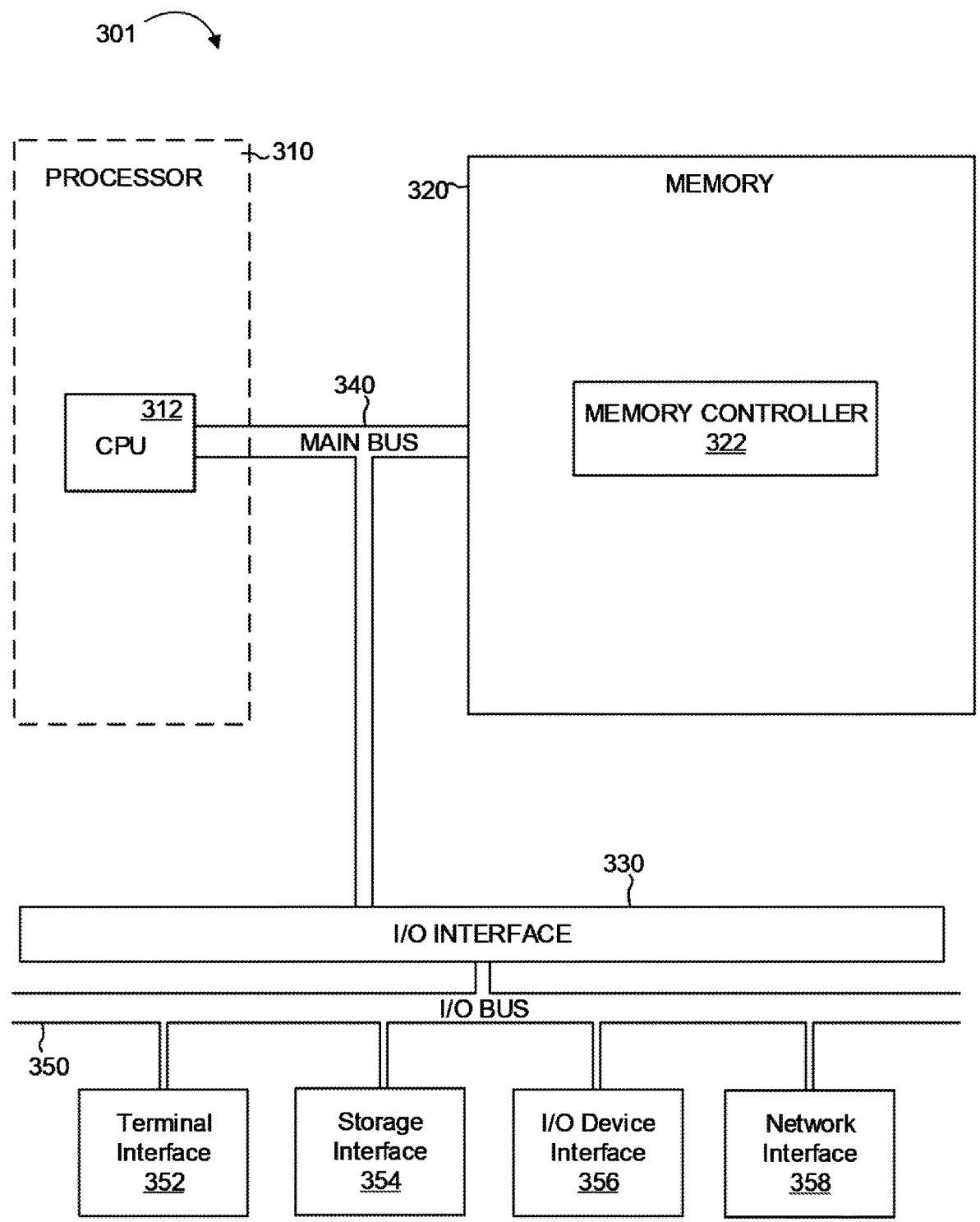
FIG. 3 depicts the representative major components of a computer system that can be used in accordance with embodiments of the present disclosure.

FIG. 3 depicts the representative major components of an exemplary Computer System 301 that can be used in accordance with embodiments of the present disclosure. The particular components depicted are presented for the purpose of example only and are not necessarily the only such variations. The Computer System 301 can comprise a Processor 310, Memory 320, an Input/Output Interface (also referred to herein as I/O or I/O Interface) 330, and a Main Bus 340. The Main Bus 340 can provide communication pathways for the other components of the Computer System 301. In some embodiments, the Main Bus 340 can connect to other components such as a specialized digital signal processor (not depicted).

The Processor 310 of the Computer System 301 can be comprised of one or more CPUs 312. The Processor 310 can additionally be comprised of one or more memory buffers or caches (not depicted) that provide temporary storage of instructions and data for the CPU 312. The CPU 312 can perform instructions on input provided from the caches or from the Memory 320 and output the result to caches or the Memory 320. The CPU 312 can be comprised of one or more circuits configured to perform one or more methods consistent with embodiments of the present disclosure. In some embodiments, the Computer System 301 can contain multiple Processors 310 typical of a relatively large system. In other embodiments, however, the Computer System 301 can be a single processor with a singular CPU 312.

The Memory 320 of the Computer System 301 can be comprised of a Memory Controller 322 and one or more memory modules for temporarily or permanently storing data (not depicted). In some embodiments, the Memory 320 can comprise a random-access semiconductor memory, storage device, or storage medium (either volatile or non-volatile) for storing data and programs. The Memory Controller 322 can communicate with the Processor 310, facilitating storage and retrieval of information in the memory modules. The Memory Controller 322 can communicate with the I/O Interface 330, facilitating storage and retrieval of input or output in the memory modules. In some embodiments, the memory modules can be dual in-line memory modules.

The I/O Interface 330 can comprise an I/O Bus 350, a Terminal Interface 352, a Storage Interface 354, an I/O Device Interface 356, and a Network Interface 358. The I/O Interface 330 can connect the Main Bus 340 to the I/O Bus 350. The I/O Interface 330 can direct instructions and data from the Processor 310 and Memory 320 to the various interfaces of the I/O Bus 350. The I/O Interface 330 can also direct instructions and data from the various interfaces of the I/O Bus 350 to the Processor 310 and Memory 320. The various interfaces can comprise the Terminal Interface 352, the Storage Interface 354, the I/O Device Interface 356, and the Network Interface 358. In some embodiments, the various interfaces can comprise a subset of the aforementioned interfaces (e.g., an embedded computer system in an industrial application may not include the Terminal Interface 352 and the Storage Interface 354).

Logic modules throughout the Computer System 301—including but not limited to the Memory 320, the Processor 310, and the I/O Interface 330—can communicate failures and changes to one or more components to a hypervisor or operating system (not depicted). The hypervisor or the operating system can allocate the various resources available in the Computer System 301 and track the location of data in Memory 320 and of processes assigned to various CPUs 312. In embodiments that combine or rearrange elements, aspects of the logic modules' capabilities can be combined or redistributed. These variations would be apparent to one skilled in the art.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
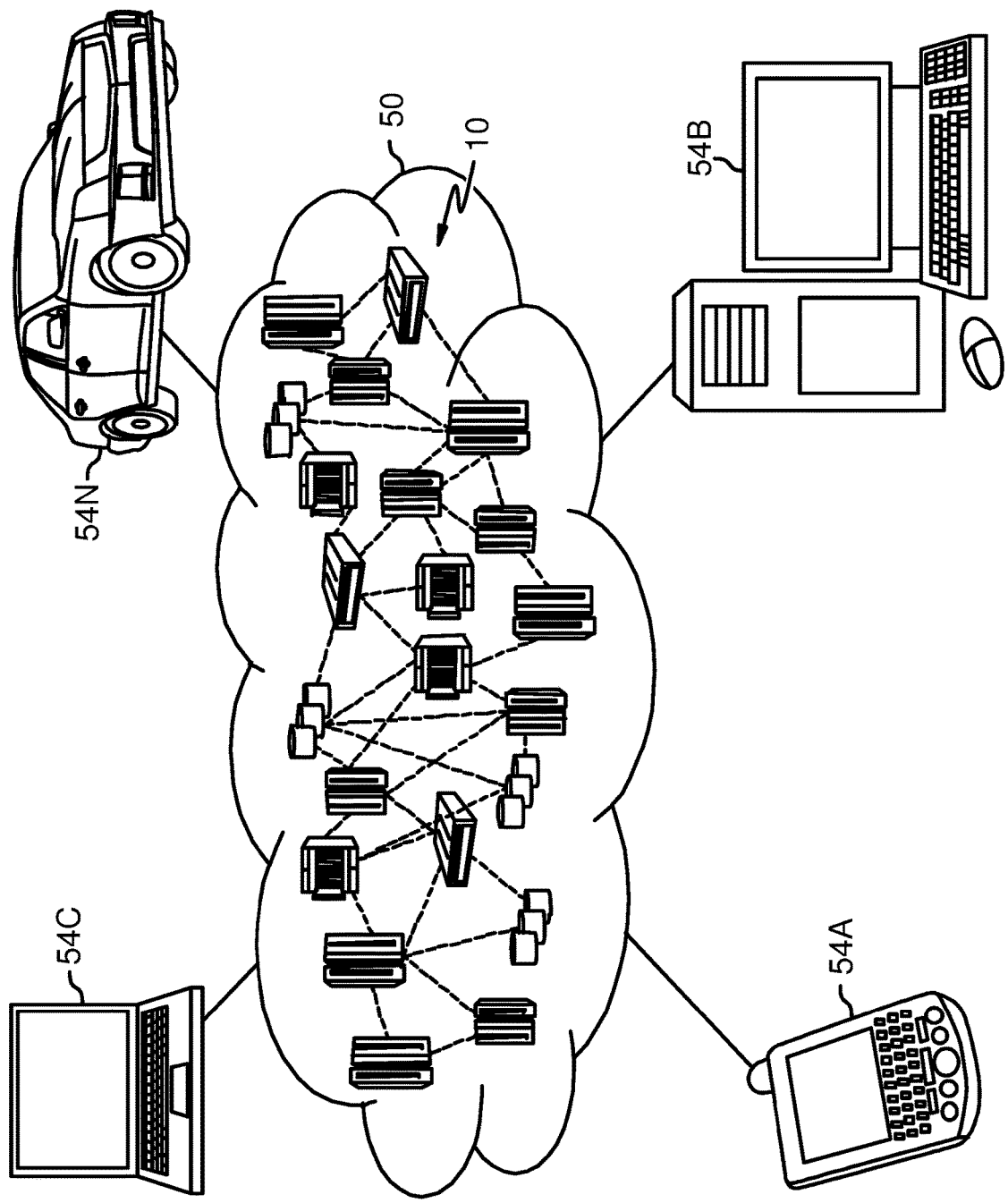
FIG. 4 depicts a cloud computing environment according to an embodiment of the present disclosure.

Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N can communicate. Nodes 10 can communicate with one another. They can be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
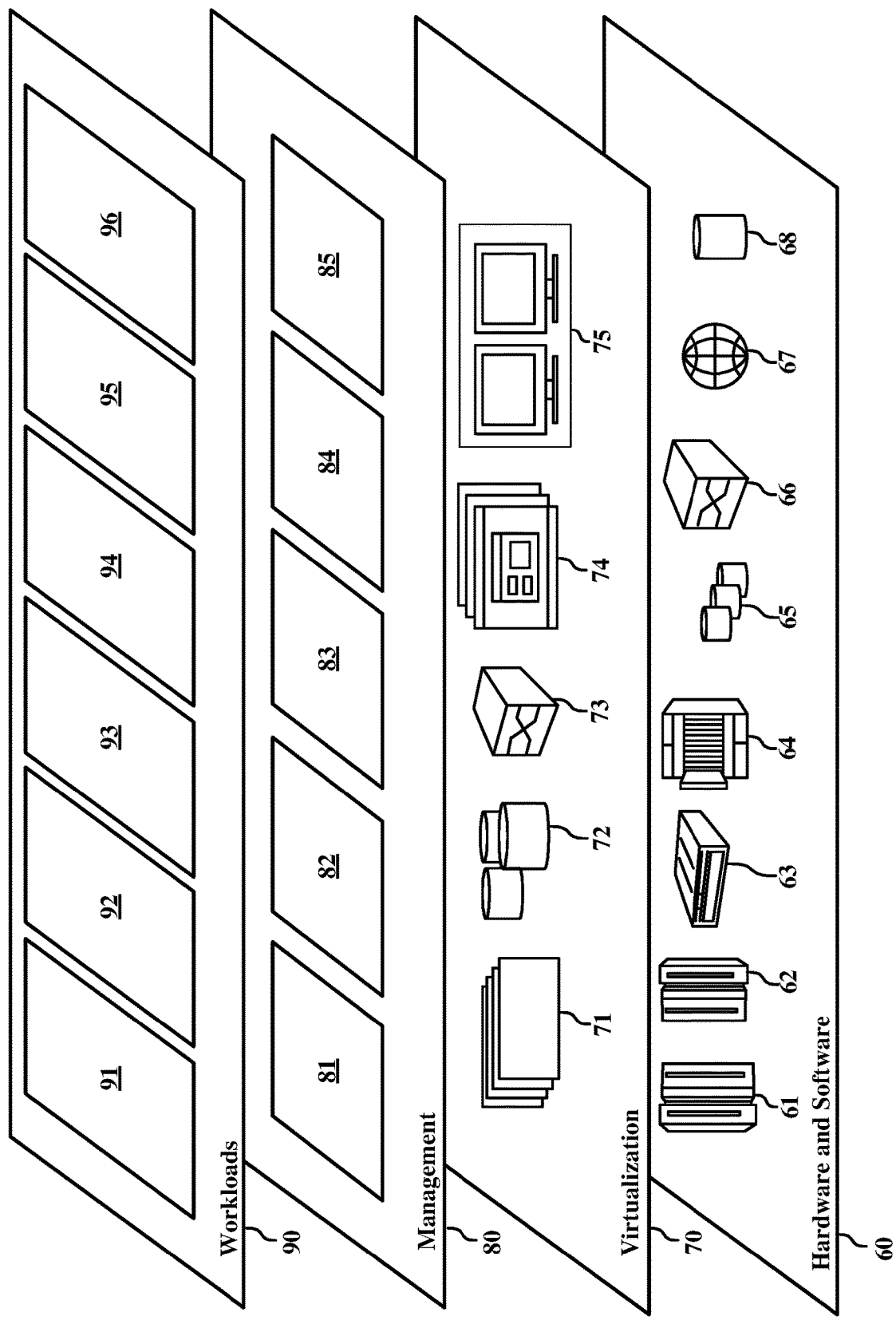
FIG. 5 depicts abstraction model layers according to an embodiment of the present disclosure.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities can be provided: virtual servers 71; virtual storage 72; virtual networks 73, including virtual private networks; virtual applications and operating systems 74; and virtual clients 75.

In one example, management layer 80 can provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources can comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment can be utilized. Examples of workloads and functions which can be provided from this layer include: mapping and navigation 91; software development and lifecycle management 92; virtual classroom education delivery 93; data analytics processing 94; transaction processing 95; and image processing logic 96.

As discussed in more detail herein, it is contemplated that some or all of the operations of some of the embodiments of methods described herein can be performed in alternative orders or may not be performed at all; furthermore, multiple operations can occur at the same time or as an internal part of a larger process.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But, the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for sequential image processing comprising:
   obtaining a first set of parameters corresponding to a first video, the first set of parameters including a first skip number and a first segment length;
   obtaining a first set of image feature values corresponding to the first video;
   storing the first set of parameters and the first set of image feature values as reference data;
   calculating a second set of image feature values corresponding to a second video;
   comparing the second set of image feature values to the reference data to generate a first degree of difference;
   determining, based on the comparing, that the first degree of difference exceeds a threshold;

calculating, in response to the determining, a variance between the first set of image feature values and the reference data;
generating, based at least in part on the variance, a second set of parameters corresponding to the second video, the second set of parameters including a second skip number and a second segment length; and
assigning the second set of parameters to the second video for performing a video analysis task with the second video.

2. The computer-implemented method of claim 1, further comprising storing the second set of image feature values and the second set of parameters as reference data.

3. The computer-implemented method of claim 2, further comprising:
calculating a third set of image feature values corresponding to a third video;
comparing the third set of image feature values to the reference data to generate a second degree of difference between the third set of image feature values and the reference data;
determining, based on the comparing, that the second degree of difference does not exceed the threshold; and
assigning, in response to the determining, the second set of parameters to the third video.

4. The computer-implemented method of claim 1, wherein calculating the variance comprises calculating a temporal variance and a spatial variance.

5. The computer-implemented method of claim 4, wherein generating the second set of parameters includes calculating a weighted sum of the temporal variance and the spatial variance.

6. The computer-implemented method of claim 1, wherein the first set of image feature values includes a 3D histogram.

7. The computer-implemented method of claim 1, wherein the first set of image feature values includes differential Red-Green-Blue (RGB) values.

8. The computer-implemented method of claim 1, wherein the first set of image feature values includes optical flow values.

9. A system comprising:
a processor; and
a memory in communication with the processor, the memory containing program instructions that, when executed by the processor, are configured to cause the processor to perform a method for sequential image processing, the method comprising:
obtaining a first set of parameters corresponding to a first video, the first set of parameters including a first skip number and a first segment length;
obtaining a first set of image feature values corresponding to the first video;
storing the first set of parameters and the first set of image feature values as reference data;
calculating a second set of image feature values corresponding to a second video;
comparing the second set of image feature values to the reference data to generate a first degree of difference between the second set of image feature values and the reference data;
determining, based on the comparing, that the first degree of difference exceeds a threshold;
calculating, in response to the determining, a variance between the second set of image feature values and the reference data;
generating, based at least in part on the variance, a second set of parameters corresponding to the second video, the second set of parameters including a second skip number and a second segment length; and
assigning the second set of parameters to the second video for performing a video analysis task with the second video.

10. The system of claim 9, further comprising storing the second set of image feature values and the second set of parameters as reference data.

11. The system of claim 10, further comprising:
calculating a third set of image feature values corresponding to a third video;
comparing the third set of image feature values to the reference data to generate a second degree of difference between the third set of image feature values and the reference data;
determining, based on the comparing, that the second degree of difference does not exceed the threshold; and
assigning, in response to the determining, the second set of parameters to the third video.

12. The system of claim 9, wherein calculating the variance comprises calculating a temporal variance and a spatial variance.

13. The system of claim 12, wherein generating the second set of parameters includes calculating a weighted sum of the temporal variance and the spatial variance.

14. The system of claim 9, wherein the first set of image feature values includes optical flow values.

15. A computer program product comprising a computer readable storage medium having program instructions embodied therewith, wherein the computer readable storage medium is not a transitory signal per se, the program instructions executable by a processor to cause the processor to perform a method for sequential image processing, the method comprising:
obtaining a first set of parameters corresponding to a first video, the first set of parameters including a first skip number and a first segment length;
obtaining a first set of image feature values corresponding to the first video;
storing the first set of parameters and the first set of image feature values as reference data;
calculating a second set of image feature values corresponding to a second video;
comparing the second set of image feature values to the reference data to generate a first degree of difference between the second set of image feature values and the reference data;
determining, based on the comparing, that the first degree of difference exceeds a threshold;
calculating, in response to the determining, a variance between the second set of image feature values and the reference data;
generating, based at least in part on the variance, a second set of parameters corresponding to the second video, the second set of parameters including a second skip number and a second segment length; and
assigning the second set of parameters to the second video for performing a video analysis task with the second video.

16. The computer program product of claim 15, further comprising storing the second set of image feature values and the second set of parameters as reference data.

17. The computer program product of claim 16, further comprising:

calculating a third set of image feature values corresponding to a third video;
comparing the third set of image feature values to the reference data to generate a second degree of difference;
determining, based on the comparing, that the second degree of difference does not exceed the threshold; and
assigning, in response to the determining, the second set of parameters to the third video.

18. The computer program product of claim 15, wherein calculating the variance comprises calculating a temporal variance and a spatial variance.

19. The computer program product of claim 18, wherein generating the second set of parameters includes calculating a weighted sum of the temporal variance and the spatial variance.

20. The computer program product of claim 15, wherein the first set of image feature values includes optical flow values.

* * * * *